Oct. 12, 1943.  A. BOYNTON  2,331,300
SIDE DRIVE FOR REAR WHEELS
Filed Nov. 6, 1941
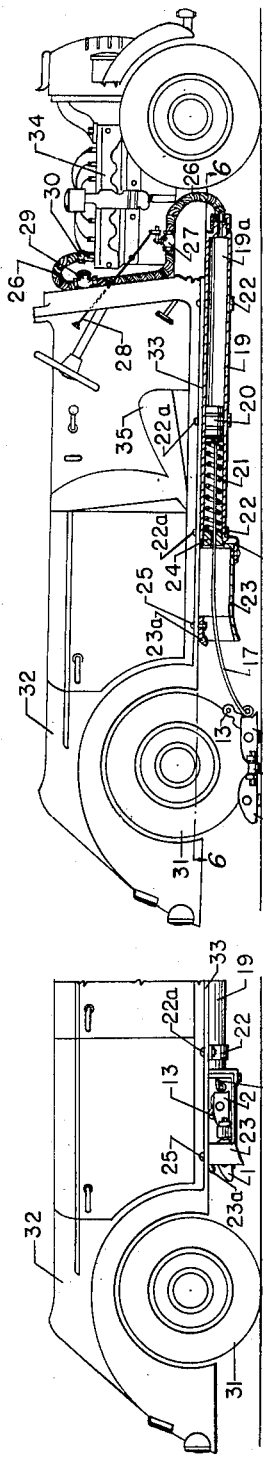
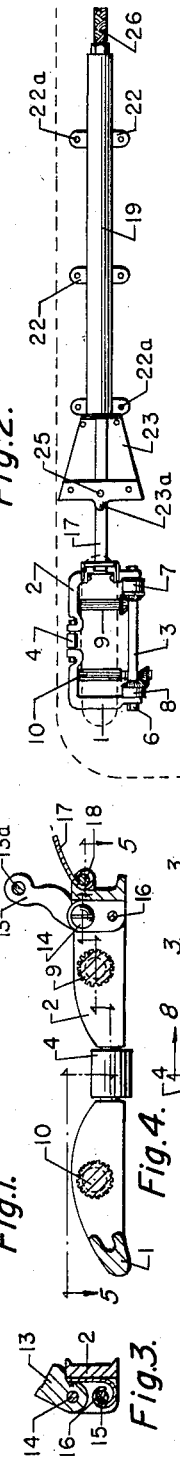
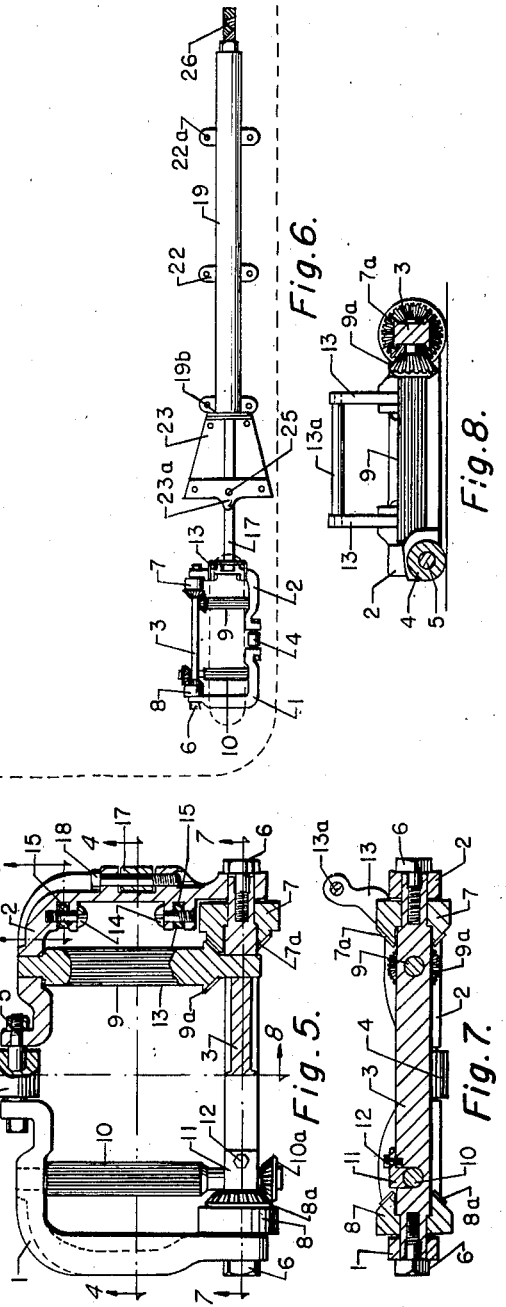
ALEXANDER BOYNTON,
INVENTOR,
BY John A. Robertson
ATTORNEY.

Patented Oct. 12, 1943

2,331,300

UNITED STATES PATENT OFFICE 2,331,300

SIDE DRIVE FOR REAR WHEELS

Alexander Boynton, San Antonio, Tex.

Application November 6, 1941, Serial No. 417,987

15 Claims. (Cl. 180—1)

My invention relates to side drives for rear wheels.

The principal object is to enable the rear of automobiles to be moved to the curb after the front wheels have been placed near the curb.

Another object is to reduce automobile turning space in streets and parking lots by enabling the rear of automobiles to be moved toward either side without having to drive forward or backward for that purpose. Thus enabling the direction of an automobile to be reversed with a minimum of operative effort and within a minimum of space.

Another object is to provide that a greater number of automobiles can be parked along streets and in lots than can be parked there by the present practice of moving them into parking positions by employing ordinary driving means.

Another object is to decrease the danger of traffic accidents resulting from backing automobiles while parking and making short turns.

Another object is to lessen the damage to automobiles and other motor driven vehicles by providing more certain means for placing them in difficult positions.

In carrying out the invention, I employ a pair of roller assemblies adapted to be forced into contact with the rear tires which then are driven upon the rollers causing them to rotate by power transmitted from the rear wheels. The rollers of each pair of assemblies have beveled pinions with gear teeth which engage mating teeth of two complemental beveled gears on small side driving wheels in each assembly mounted at right angles to the rear wheels which, when turned in one direction, will drive the small wheels to move the rear of the automobile or other motor driven vehicle toward one side. When the rear wheels are turned in the opposite direction, the side driving wheels will move the rear of the vehicle in the opposite direction, all of which will be made more clear by the following specification and the accompanying drawing in which—

Fig. 1 is a partial side view of the device in its idle position installed upon an automobile.

Fig. 2 is partially a longtudinal section and partially a side view of the device in operation.

Fig. 3 is a section on the line 3—3, Fig. 5.

Fig. 4 is a section on the line 4—4, Fig. 5.

Fig. 5 is a section on the line 5—5, Fig. 4.

Fig. 6 is a top view of the device taken from the line 6—6, Fig. 2, the rear automobile wheels being omitted but the position thereof indicated by dotted lines.

Fig. 7 is a section on the line 7—7, Fig. 5.

Fig. 8 is a section on the line 8—8, Fig. 5.

Similar reference characters are employed to designate similar parts throughout the several views.

In Fig. 6, it will be observed that the installation consists of a pair of units each adapted to be operated by one of the rear tires 31 of an automobile or other motor driven vehicle 32 as appears in Fig. 2, the idle position of each device being illustrated in Fig. 1.

With special reference to Fig. 5, each unit is illustrated as including a frame and roller assembly. The frame rear end member 1 and the frame front end member 2 are secured together by the axle bolt 5 having the outside roller 4 rotatable upon it and by the frame inside member 3 having its circular ends of reduced diameter secured through the members 1 and 2 by the assembling bolts 6. The frame is composed of the members 1, 2, and 3 supporting the drive rollers 9 and 10 each having a pinion thereon adapted to drive one of the gear wheels 7 and 8 rotatable upon the inside member 3.

The drive roller 9 has its ends of reduced diameter received in openings through the members 2 and 3. This roller is integral with the pinion 9a having gear teeth engageable with the mating gear teeth 7a upon the gear wheel 7 which is rotatable upon a circular portion of the frame inside member 3. The drive roller 10 has its outer circular end of reduced diameter received in an opening through the frame rear end member 1 and has another circular portion confined within a bearing slot in the inside member 3 by the bearing cap 11 secured to said inside member 3 by the bolt 12, (see Figs. 5 and 7).

The beveled pinion 10a, integral with the roller 10, has gear teeth engageable with the mating gear teeth 8a upon the complemental beveled gear wheel 8 which is rotatable upon a circular portion of the inside member 3.

The rollers 9 and 10 are adapted to be placed under and to be driven by the rear tires 31 of a motor driven vehicle such as the automobile shown at 32; thereby causing the rollers 7 and 8 to turn upon the ground so as to move the rear end of the vehicle 32 in either lateral direction. The idle or undriven outside roller 4, extending somewhat below the members 1 and 2, also is adapted to roll upon the ground and to support the frame and roller assembly.

The tire stop arms 13, Figs. 3, 4, 7, and 8, are secured rockably upon the frame front end member 2 by the bolts 14 and support the roller 13a, having ends of reduced diameter fitted rotatably within said arms as is indicated in Fig. 8. Each of the J-shaped springs 15, there being two alike, having one end secured through the pin 16 pressed into the member 2, has its other end hooked and engaged within a slot of one of the arms 13, as appears in Fig. 3. The arms 13 normally are held resiliently by said J-shaped springs in the position shown in Fig. 4. These arms, engaging upon the frame front end member 2, support the rollers 13a in position to prevent the tires 31 from driving over the frame and roller assemblies, as appears in Fig. 2.

The bolt 18, secured within the front end frame member 2, has one end of the flat spring 17 secured upon it. This spring is slidable in a slot through the plug 24 engaged within the rear end of the cylinder 19 and has connection to the piston 20 which is slidable within said cylinder secured upon the nether side of the running board 33 by the clamps 22 and the bolts 22a. The coiled spring 21, having slight clearance within the cylinder 19, is engaged between the piston 20 and the plug 24 and normally urges the piston to engage the forward end of the cylinder while the assembled frame and rollers are received within the housing 23 secured upon the nether side of the running board 33 by the bolt 25 engaged through an upper plate of this housing having the inclined lip 23a, the forward end of the housing 23 being supported by the end flange 19b of the cylinder 19.

The metallic hose or other type of conduit 26, having the three-way valve 27 operable from the front seat 35 by the lever 28 and the check valve 29 which closes toward the front, has connection with the forward end of the cylinder 19 and with the nipple 30 connected into one of the cylinders of the internal combustion motor 34.

The hose 26 is adapted to convey pressure fluid from the motor 34 into the chamber 19a of the cylinder 19, the three-way valve 27 in one position being adapted to drain this pressure fluid out of the chamber 19a while, at the same time, it will close the hose passage from the motor.

*Operation*

Each of the devices being within the housing 23 as in Fig. 1, to place the rollers 9 and 10 under the rear tires 31, turn the three-way valve 27 so as to charge the chamber 19a through the hose 26 with somewhat more pressure fluid than will force the piston 20 backward and cause the frame and roller assemblies to contact the rear tires at the ground surface immediately forward of the tires. Then, drive the automobile or other motor driven vehicle forward until the tires 31 engage the rollers 13a, it being understood that the fluid force within the chamber 19a is sufficient to maintain the roller assemblies in firm contact with the rear tires while the automobile is driven forward to mount the tires upon the roller assemblies. The tires then will rest upon the rollers 9 and 10 which will be driven by them to turn the wheels 7 and 8 toward either side and swing the rear end of the vehicle one way in low gear or the opposite way in reverse gear. While the side driving operations are being carried out the fluid pressure in the chamber 19a will be maintained to preclude any relative movement between the frame and roller assemblies and the automobile.

After the rear end of the vehicle has been turned as desired, discharge the pressure fluid from the chamber 19a by means of the three-way valve 27, speed up the motor, engage the clutch quickly, and back off of the rollers. During the backing off operation, and thereafter the spring 21 will force the piston 20 forward, the lip 23a folding backward the arms 13, while the assembled frame and rollers reenter the housing 23, as appears in Fig. 1, it being borne in mind that all operations affect alike the duplicate units which are disposed as shown in Fig. 6.

It will be understood that only one assembly may be employed in place of two as shown, but if only one be employed under one rear wheel, the other wheel will slip or drag the ground during the side driving operations. By discharging a little liquid such as water upon the surface to be slipped over by the undriven wheel the same may be made to slip easily.

The roller 13a, the tire stop arms 13 and associate parts may be omitted if the automobile be driven carefully upon the roller assemblies. Likewise the outside roller 4 may be omitted and skidding means substituted therefor. It is also apparent that two other gear wheels may be added at the outer ends of the drive rollers 9 and 10 to supplement the other gear wheels 7 and 8.

The showing of these twin devices will be understood as illustrative examples which are subject to many minor changes in construction and arrangement of parts which will remain within the scope and purpose of this specification and the appended claims.

I claim:

1. In a side drive for rear wheels of a motor driven vehicle, a pair of complete assemblies, each said assembly comprising: a frame rear end member; a frame front end member; a frame inside member secured upon one end of said rear and front end members; an axle bolt securing the other ends of said members in spaced relation; an outside roller upon said bolt; first and second beveled gear wheels rotatably secured upon said inside member, each of said wheels having gear teeth; a first drive roller rotatably secured in said front end and inside members, said first drive roller having a beveled pinion with teeth engaged with gear teeth of said first gear wheel; a second drive roller rotatably secured in said rear end and inside members, said second drive roller having a beveled pinion with teeth engageable with gear teeth of said second gear wheel; a pair of tire stop arms rockably secured upon said front end member; a spring urging each said arm forward; a roller rotatably secured upon and between said arms; a cylinder secured upon each side of said vehicle; a piston slidable in said cylinder; a slotted plug in one end of said cylinder; a coiled spring between said plug and piston and urging said piston forward; a flat spring secured upon said front end member and to said piston, said flat spring being slidable through said plug and having clearance within said coiled spring; a housing upon said cylinder and vehicle, said housing being adapted to receive one of said assemblies; a hose connected between the front end of said cylinder and a source of pressure fluid; a check valve in said hose, said valve closing toward said source; and a three-way valve in said hose between said cylinder and said source.

2. In a side drive for rear wheels of a motor driven vehicle, a pair of complete asemblies, each said assembly comprising: a frame rear end member; a frame front end member; a frame inside member secured upon one end of said rear and front end members; an axle bolt securing the other ends of said members in spaced relation; an outside roller upon said bolt; first and second beveled gear wheels rotatably secured upon said inside member, each of said wheels having gear teeth; a first drive roller rotatably secured in said front end and inside members, said first drive roller having a beveled pinion with teeth engaged with gear teeth of said first gear wheel; a second drive roller rotatably secured in said rear end and inside members, said second drive roller having a beveled pinion with teeth engageable with gear teeth of said second gear wheel; a cylinder secured upon each side of said vehicle; a piston slidable in said cylinder; a slotted plug in one end of said cylinder; a spring between said plug and piston and urging said piston forward; a flat spring secured upon said front end member and to said piston, said flat spring being slidable through said plug and having clearance within said spring; a housing upon said cylinder and vehicle, said housing being adapted to receive one of said assemblies; a hose connected between the front end of said cylinder and a source of pressure fluid; a check valve in said hose, said valve closing toward said source; and a three-way valve in said hose between said cylinder and said source.

3. In a side drive for rear wheels of a motor driven vehicle, a pair of complete assemblies, each said assembly comprising: a frame; a pair of spaced drive rollers transverse thereof, each said roller having a beveled pinion thereon; a pair of beveled gear wheels rotatably mounted upon said frame and each having teeth enmeshed with one of said pinions, in combination with; a pair of cylinders upon said vehicle and each aligned with one of said rear wheels; a piston in each said cylinder; a spring normally urging each said piston to the front end of one said cylinder; a housing for one said assembly at the rear end of each said cylinder; and pressure fluid means for forcing said pistons backward to position said assemblies in front of said rear wheels, so that said rear wheels may be driven upon said rollers to side drive said rear wheels in one direction when said rear wheels are turned forward and in the reverse direction when said rear wheels are turned backward.

4. In a side drive for rear tires of motor driven vehicles: a pair of frames; a pair of drive rollers rotatably secured in each said frame; gear wheels upon said frames, arranged in right angular relation to, and adapted to be driven by said rollers; a pair of cylinders each upon the opposite side of said vehicles and aligned with said rear wheels; a piston in each said cylinder; spring means urging said pistons to the forward ends of said cylinders so as to normally house said assemblies proximate said cylinders; pressure fluid means for forcing said assemblies backward in front of said rear tires so that said tires may be driven upon said rollers to drive said gear wheels to one side or the other responsive to the direction in which said rear wheels are turned; and means for operating said pressure fluid means from the driver's seat of each said vehicle.

5. In a side drive for rear wheels of a self propelled vehicle: a pair of spaced rollers adapted to be driven by the rear wheels of said vehicle; gear wheels having a right angular relation with respect to said rollers; means upon said rollers for driving said gear wheels in one direction when said rear wheels are rotating forward and in the reverse direction when said rear wheels are rotating backward, and the combination of; piston, spring, and pressure fluid means operable from the driver's seat for placing said rollers where said rear wheels may be driven on and off of them to side drive said gear wheels in one lateral direction or the other to move said rear wheels upon said rollers responsive to the driving direction of said rear wheels.

6. As a roller assembly in means for side driving rear wheels of motor driven vehicles: a frame rear end member; a frame front end member; a frame inside member secured upon one end of said rear and front end members; an axle bolt securing the other ends of said members in spaced relation; an outside roller upon said bolt; first and second beveled gear wheels rotatably secured upon said inside member, each of said wheels having gear teeth; a first drive roller rotatably secured in said front end and inside members, said first drive roller having a beveled pinion with teeth engaged with said gear teeth of said first gear wheel; and a second drive roller rotatably secured in said rear end and inside members, said second drive roller having a beveled pinion with teeth engaged with said gear teeth of said second gear wheel.

7. As a means for side driving rear wheels of motor driven vehicles: a pair of cylinders secured upon opposite sides of such vehicles and aligned with the rear wheels thereof; a piston in each said cylinder; a spring urging each said piston to the front end of each said cylinder; a roller assembly housing upon the rear end of each said cylinder; and a roller assembly comprising; a frame rear end member; a frame front end member; a frame inside member secured upon one end of said rear and front end members; an axle bolt securing the other ends of said members in spaced relation; an outside roller upon said bolt; first and second beveled gear wheels rotatably secured upon said inside member, each of said wheels having gear teeth; a first drive roller rotatably secured in said front end and inside members, said first drive roller having a beveled pinion with teeth engaged with said gear teeth of said first gear wheel; and a second drive roller rotatably secured in said rear end and inside members, said second drive roller having a beveled pinion with teeth engaged with said gear teeth of said second gear wheel.

8. As a means for side driving rear wheels of motor driven vehicles: a pair of cylinders secured upon opposite sides of such vehicles and aligned with the rear wheels thereof; a piston in each said cylinder; a spring urging each said piston to the front end of each said cylinder; a roller assembly housing upon the rear end of each said cylinder; and a roller assembly comprising; a frame; a pair of spaced drive rollers transverse thereof, each said roller having a beveled pinion thereon; and a pair of beveled gear wheels rotatably mounted upon said frame and each enmeshed with one of said pinions; and means to deliver fluid to said pistons to force them outwardly in opposition to said springs, for purposes described.

9. As a means for side driving rear wheels of motor driven vehicles: a pair of cylinders secured upon opposite sides of such vehicles and aligned with the rear wheels thereof; a piston in each said cylinder; a spring urging each said piston to the front end of each said cylinder; and roller assemblies comprising, a pair of frames; a pair of drive rollers rotatably secured in each said frame; and gear wheels upon said frames, said gear wheels being in substantially a right angular relation to, and adapted to be driven by said rollers; flat springs connecting said pistons with said roller assemblies; and means to deliver fluid to said pistons to force them outwardly in opposition to said piston-urging springs, for purposes described.

10. As a means for side driving the rear wheels of motor driven vehicles: a frame and roller assembly; gear wheels on said assembly and adapted to move the same laterally in one direction when rotated in one direction and to move the same laterally in the other direction when rotated in the reverse direction; drive rollers in said frame, said drive rollers having a substantially right angular relation to said gear wheels and adapted to turn said gear wheels, said rollers being adapted to be driven by the rear wheels of said vehicle; means for housing said assembly upon said vehicle; and means for removing said assembly from said housing and placing said assembly in position to be driven upon by said rear wheels to move the same laterally in either direction responsive to the direction in which said rear wheels are driven.

11. As a means for side driving the rear wheels of motor driven vehicles, a pair of spaced units each comprising: a frame and roller assembly; gear wheels on said assembly and adapted to move the same laterally in one direction when rotated in one direction and to move the same laterally in the other direction when rotated in the reverse direction; drive rollers in said frame, said drive rollers having a substantially right angular relation to said gear wheels and adapted to turn said gear wheels, said rollers being adapted to be driven by the rear wheels of said vehicle; means for housing said assembly upon said vehicle; and means for removing said assembly from said housing and placing said assembly in position to be driven upon by said rear wheels to move the same laterally in either direction responsive to the direction in which said rear wheels are driven.

12. As a means for side driving the rear wheels of a motor driven vehicle, the combination of: a frame and roller assembly having a pair of drive rollers therein and a complemental pair of beveled gear wheels thereon, said gear wheels being adapted to be driven by said rollers to move said assembly laterally; means for housing said assembly upon said vehicle; and means for removing said assembly from said housing and disposing said assembly so that said rollers will be driven upon by the rear wheels of said vehicle to move said rear wheels therewith in either lateral direction as the same are rotated upon said vehicle responsive to the driving force thereof, said disposing means being operable from the driver's seat of said vehicle.

13. The combination of a motor vehicle having a power driven rear wheel and a side drive for said rear wheel, said side drive comprising: a frame and roller assembly adapted to be positioned beneath said rear wheel and including a drive roller arranged substantially at right angles to said rear wheel; means to drive said roller from said rear wheel; and means located on said frame to prevent relative movement between said assembly and motor vehicle when said drive roller is driven by said rear wheel.

14. The combination of a motor vehicle having a power driven rear wheel and a side drive for said rear wheel, said side drive comprising: a frame and roller assembly adapted to be positioned beneath said rear wheel and including a drive roller arranged substantially at right angles to said rear wheel; means to drive said roller from said rear wheel; a housing on said vehicle normally containing said assembly; and means for positively moving said assembly into engagement with said rear wheel, said last means being effective to urge said assembly against said rear wheel as the latter is being driven thereonto.

15. The combination of a motor vehicle having a power driven rear wheel and a side drive for said rear wheel, said side drive comprising: a frame and roller assembly adapted to be positioned beneath said rear wheel and including a drive roller arranged substantially at right angles to said rear wheel; means to drive said roller from said rear wheel; a housing on said vehicle for enclosing said assembly; yieldable means normally urging said assembly into said housing; and pressure fluid actuated means for moving said assembly out of said housing in opposition to said yieldable means.

ALEXANDER BOYNTON.